(12) United States Patent
Kim et al.

(10) Patent No.: US 10,626,303 B2
(45) Date of Patent: Apr. 21, 2020

(54) ADHESIVE SHEET HAVING BARRIER APPLIED THERETO AND METHOD OF MANUFACTURING THE SAME

(71) Applicant: SMART CO., LTD., Seoul (KR)

(72) Inventors: Sung Je Kim, Seoul (KR); Wang Je Kim, Seoul (KR); Jung Hey Lee, Gwangju-si (KR)

(73) Assignee: SMART CO., LTD., Seoul (KR)

( * ) Notice: Subject to any disclaimer, the term of this patent is extended or adjusted under 35 U.S.C. 154(b) by 0 days.

(21) Appl. No.: 15/771,705

(22) PCT Filed: Dec. 27, 2017

(86) PCT No.: PCT/KR2017/015517
§ 371 (c)(1),
(2) Date: Apr. 27, 2018

(87) PCT Pub. No.: WO2018/124714
PCT Pub. Date: Jul. 5, 2018

(65) Prior Publication Data
US 2019/0077995 A1    Mar. 14, 2019

(51) Int. Cl.
*C09J 7/20* (2018.01)
*C09J 7/38* (2018.01)
(Continued)

(52) U.S. Cl.
CPC . *C09J 7/20* (2018.01); *C09J 7/30* (2018.01); *C09J 7/38* (2018.01); *C09J 7/405* (2018.01); *C09J 9/00* (2013.01); *C09J 201/00* (2013.01); *B32B 3/30* (2013.01); *B32B 7/14* (2013.01); *B32B 29/002* (2013.01); *B32B 33/00* (2013.01); *B32B 38/145* (2013.01); *B32B 2305/00* (2013.01); *B32B 2307/724* (2013.01);
(Continued)

(58) Field of Classification Search
CPC ................ C09J 7/05; Y10T 428/24851; Y10T 428/2486; Y10T 428/2495; Y10T 428/28; Y10T 428/2839; Y10T 428/2848; Y10T 428/2457
See application file for complete search history.

(56) References Cited

U.S. PATENT DOCUMENTS

2004/0197533 A1\* 10/2004 Kamiyama .......... B41M 7/0027
428/195.1
2019/0077995 A1\* 3/2019 Kim .......................... C09J 7/38

\* cited by examiner

*Primary Examiner* — Betelhem Shewareged
(74) *Attorney, Agent, or Firm* — Novick, Kim & Lee, PLLC; Jae Youn Kim

(57) ABSTRACT

Provided are an adhesive sheet including a base layer, an adhesive layer, and a release paper, which are sequentially disposed, the adhesive layer being attached to a target for attachment after the release paper is removed, wherein the adhesive layer includes a first adhesive layer, which is attached to one surface of the base layer, and second adhesive layers attached to the first adhesive layer and to the release paper, the second adhesive layers being arranged so as to form a pattern, wherein the second adhesive layers remain attached to the target for attachment, wherein a film is attached to the target for attachment without requiring the film to be wet with water, and wherein an air layer or air bubbles are discharged from the adhesive sheet through paths that serve to discharge the air bubbles, thereby preventing a reduction of initial adhesive force, solving a problem of freezing, and achieving easy attachment, and a method of manufacturing the same.

10 Claims, 12 Drawing Sheets

(51) Int. Cl.
*C09J 7/40* (2018.01)
*C09J 7/30* (2018.01)
*C09J 9/00* (2006.01)
*C09J 201/00* (2006.01)
*B32B 3/30* (2006.01)
*B32B 7/14* (2006.01)
*B32B 29/00* (2006.01)
*B32B 33/00* (2006.01)
*B32B 38/00* (2006.01)

(52) U.S. Cl.
CPC ..... *B32B 2307/726* (2013.01); *B32B 2405/00* (2013.01); *C09J 2201/28* (2013.01); *C09J 2201/36* (2013.01); *C09J 2205/10* (2013.01); *C09J 2400/226* (2013.01); *C09J 2400/283* (2013.01); *C09J 2401/005* (2013.01); *Y10T 428/2457* (2015.01); *Y10T 428/2486* (2015.01); *Y10T 428/2495* (2015.01); *Y10T 428/24851* (2015.01); *Y10T 428/28* (2015.01); *Y10T 428/2839* (2015.01); *Y10T 428/2848* (2015.01)

ADHESIVE SHEET HAVING BARRIER APPLIED THERETO AND METHOD OF MANUFACTURING THE SAME

TECHNICAL FIELD

The present invention relates to an adhesive sheet having a barrier applied thereto and a method of manufacturing the same, and more particularly to an adhesive sheet having a plurality of collection portions capable of collecting air or moisture at the time of attachment of the adhesive sheet, whereby it is possible to fundamentally prevent the introduction of moisture or air through air discharge paths, and a method of manufacturing the same.

BACKGROUND ART

In the case of a conventional adhesive sheet, paths are formed in an adhesive surface of the adhesive sheet in order to remove air or moisture that may be generated at the time of attachment of the adhesive sheet. In order to form the paths, there has been used a method of adjusting the shape of the surface of a release paper or a release film before silicon treatment such that the shape is transferred to the surface of an adhesive layer, whereby air or moisture is easily removed using the paths formed as the result thereof.

However, the adhesive force of the conventional adhesive sheet is reduced over time, whereby the adhesive layer is separated or the shape of the adhesive layer is changed. As a result, the paths may not properly function to discharge air or moisture.

In addition, water must be used when the conventional adhesive sheet is attached to the surface of a target for attachment. In the winter season, in which the temperature is low, however, the water may easily freeze.

Furthermore, in the case in which an adhesive sheet having no paths, through which air is discharged from the adhesive layer, is used, a film is cut using a sharpened tool such as a cutter such that an air bubble layer is removed in order to remove air bubbles that are trapped sporadically at the time of attachment of the adhesive sheet. After the lapse of a predetermined amount of time, however, the cut portions in the film may open, whereby a product becomes defective.

In order to solve the above problem, there has been developed an adhesive sheet having air discharge paths that are defined in a patterned adhesive layer formed on an adhesive surface of the adhesive sheet in order to discharge air that may be generated at the time of attachment of the adhesive sheet to the outside while maintaining the adhesive force of the adhesive sheet.

However, the air discharge paths in the adhesive sheet are maintained even after the attachment of the adhesive sheet. As a result, air or moisture may be reintroduced into the adhesive sheet through the air discharge paths, whereby the period during which the adhesive sheet remains attached is shortened.

DISCLOSURE

Technical Problem

The present invention has been made in view of the above problems, and it is an object of the present invention to provide an adhesive sheet having a plurality of collection portions capable of collecting air or moisture at the time of attachment of the adhesive sheet, whereby it is possible to fundamentally prevent the introduction of moisture or air through air discharge paths, and a method of manufacturing the same.

Technical Solution

In accordance with an aspect of the present invention, the above and other objects can be accomplished by the provision of an adhesive sheet including a base layer, an adhesive layer, and a release paper, which are sequentially disposed, the adhesive layer being attached to a target for attachment after the release paper is removed, wherein the adhesive layer includes a first adhesive layer, which is attached to one surface of the base layer, and second adhesive layers attached to the first adhesive layer and to the release paper, the second adhesive layers being arranged so as to form a pattern, and the adhesive layer further includes a barrier disposed so as to surround the second adhesive layers to form a plurality of collection portions.

The second adhesive layers may be recessed into the first adhesive layer from one surface of the first adhesive layer in order to form the pattern.

Discharge paths may be formed between the second adhesive layers and the target for attachment.

The second adhesive layers may protrude outwards from one surface of the first adhesive layer in order to form the pattern.

Discharge paths may be formed between the second adhesive layers.

The second adhesive layers may be aged such that the adhesive force of the second adhesive layers gradually becomes higher than the adhesive force of the second adhesive layers when the second adhesive layers are initially attached to the target for attachment.

Each of the first adhesive layer and the second adhesive layers may be made of a material including at least one of organic matter, acrylic, silicon, metal silicon, polyester, polyurethane, ethylene co-vinyl acetate (EVA), or polyvinyl acetate (PVAc).

The barrier may be constituted by a plurality of polygonal unit patterns.

Each of the polygonal unit patterns may be quadrangular or hexagonal.

Each of the unit patterns may be provided with a plurality of micro-scale channels for interconnecting adjacent ones of the collection portions.

Each of the micro-scale channels may have a width ranging from 10 μm to 50 μm.

The width of each of the micro-scale channels may be reduced as the result of the adhesive sheet being pressed after the adhesive sheet is attached to the target for attachment.

In accordance with another aspect of the present invention, there is provided a method of manufacturing an adhesive sheet having a barrier applied thereto, the method including printing second adhesive layers for forming a pattern on one surface of a release paper, printing a barrier for forming a plurality of collection portions so as to surround the second adhesive layers on the one surface of the release paper, introducing a base adhesive sheet including a base layer and a first adhesive layer, and laminating the base adhesive sheet and the release paper such that the first adhesive layer, the second adhesive layers, and the barrier are bonded to each other.

The step of laminating the base adhesive sheet and the release paper may include laminating the base adhesive sheet and the release paper such that the second adhesive layers are recessed into the first adhesive layer in order to form the pattern.

The step of laminating the base adhesive sheet and the release paper may include laminating the base adhesive sheet and the release paper such that the second adhesive layers protrude outwards from the first adhesive layer in order to form the pattern.

The method may further include forming a plurality of micro-scale channels in the barrier before the step of introducing the base adhesive sheet is performed.

Advantageous Effects

In the adhesive sheet having the barrier according to the present invention applied thereto, the barrier is formed in the space defined by the discharge paths so as to surround the second adhesive layers. Even after the adhesive sheet is attached to the target for attachment, therefore, it is possible to prevent the introduction of air or moisture from the outside, whereby it is possible to prevent deterioration in the attachment performance of the adhesive sheet or to prevent a reduction in the period during which the adhesive sheet remains attached to the target for attachment.

Each of the unit patterns constituting the barrier according to the present invention may be provided with a plurality of micro-scale channels for interconnecting adjacent collection portions. Even when air bubbles are nonuniformly generated, therefore, air constituting the air bubbles may be uniformly distributed to the respective collection portions through the micro-scale channels. Consequently, it is possible to greatly improve efficiency in holding, absorbing, and collecting air bubbles that may be generated between the adhesive sheet and the target for attachment.

BEST MODE

Figure 1:
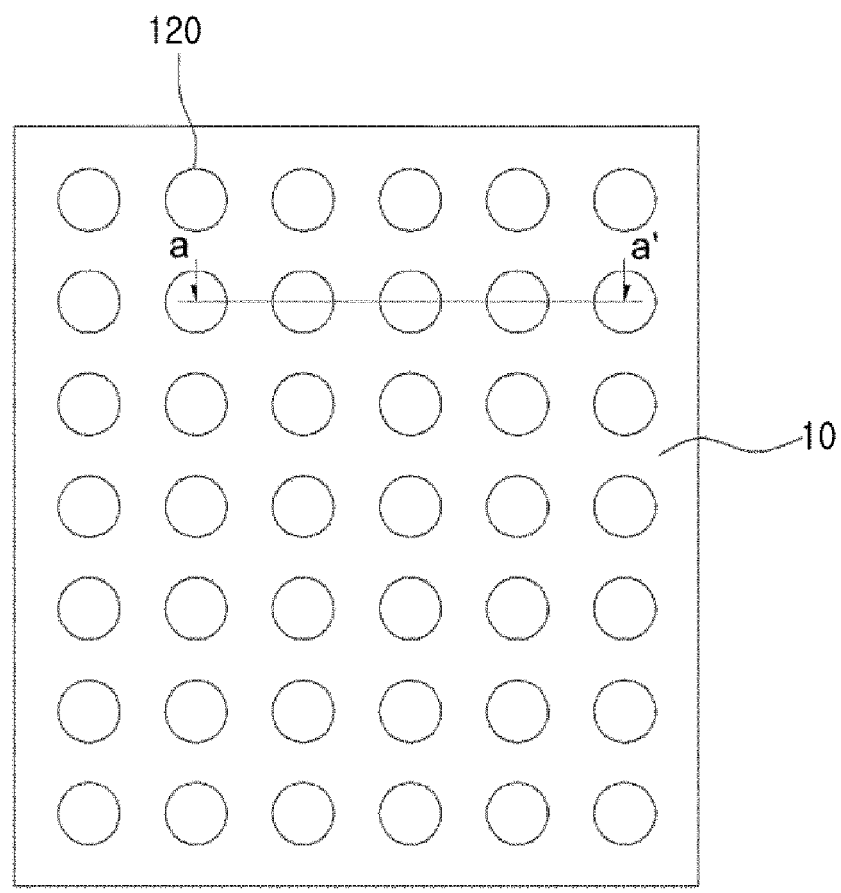
FIG. 1 is a plan view showing an adhesive sheet according to an embodiment of the present invention.

Reference will now be made in detail to the preferred embodiments of the present invention, examples of which are illustrated in the accompanying drawings. The following embodiments are given by way of example in order to enable those skilled in the art to fully understand the idea of the present invention. Therefore, the present invention is not limited by the following embodiments, and may be realized in other forms.

In order to clearly describe the present invention, parts having no relation with the description of the present invention have been omitted from the drawings. In the drawings, the width, length, thickness, etc. of each element may be exaggerated for the sake of convenience. Wherever possible, the same reference numbers will be used throughout the specification to refer to the same or like parts.

Hereinafter, an adhesive sheet and a method of manufacturing the same according to preferred embodiments of the present invention will be described in detail with reference to the accompanying drawings.

Figure 2:
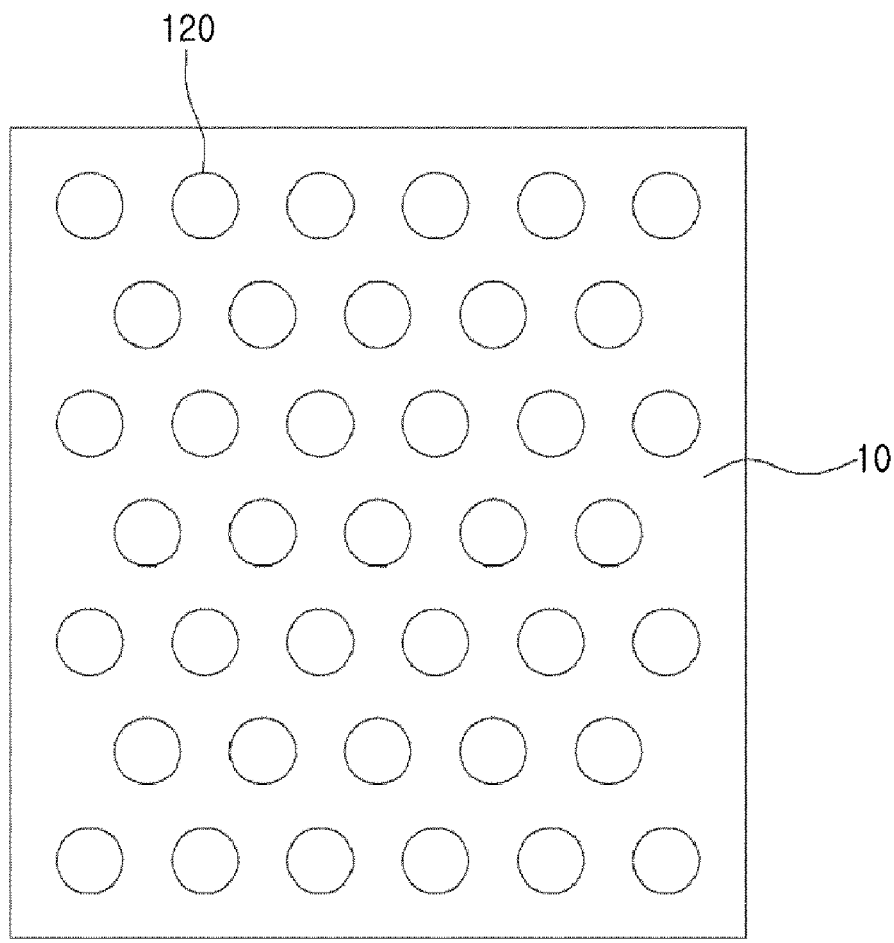
FIG. 2 is a plan view showing an adhesive sheet according to another embodiment of the present invention.
Figure 3:
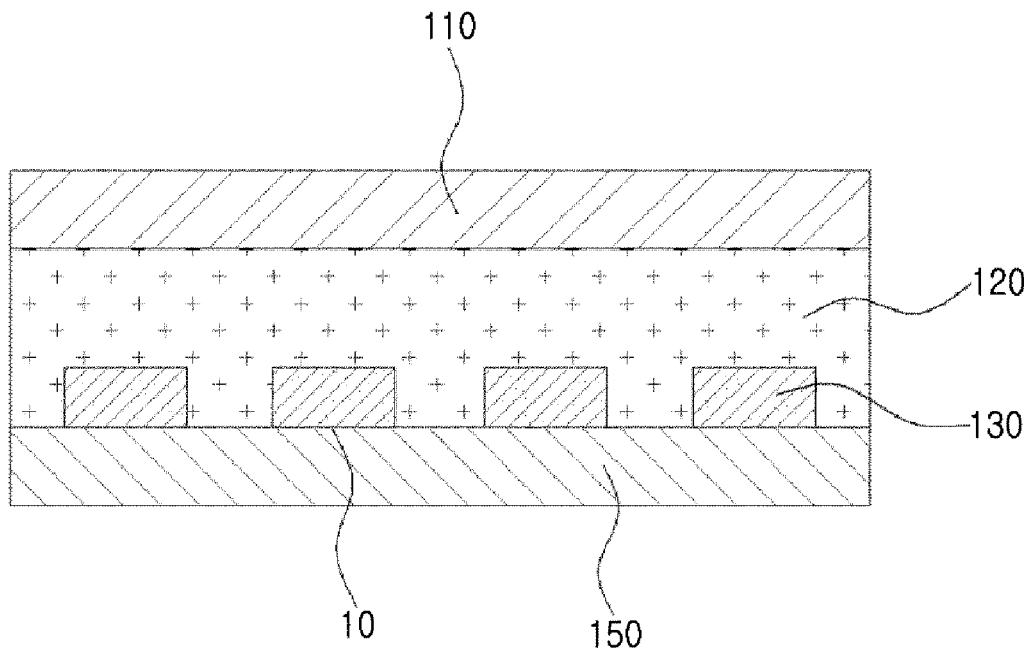
FIG. 3 is a sectional view of the adhesive sheet according to the an embodiment of the present invention taken along line a-a' of FIG. 1.
Figure 4:
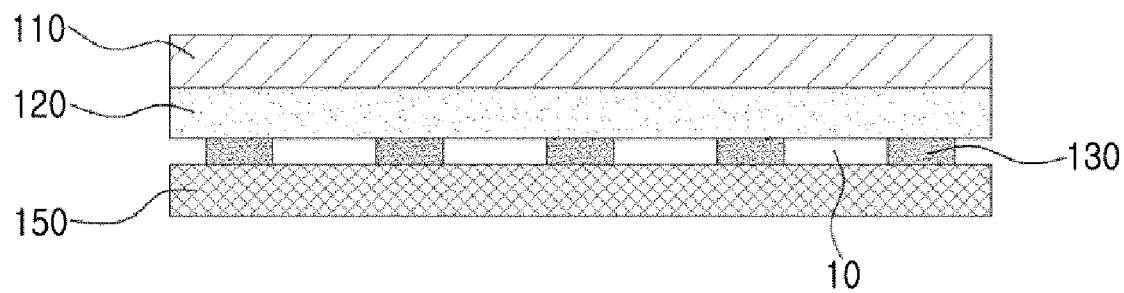
FIG. 4 is a sectional view of the adhesive sheet according to the another embodiment of the present invention.

FIG. 1 is a plan view showing an adhesive sheet according to an embodiment of the present invention, FIG. 2 is a plan view showing an adhesive sheet according to another embodiment of the present invention, FIG. 3 is a sectional view of the adhesive sheet according to the an embodiment of the present invention taken along line a-a' of FIG. 1, and FIG. 4 is a sectional view of the adhesive sheet according to the another embodiment of the present invention.

In the following, the term "sheet" will be used. However, the term "sheet" may be intended to include film. Of course, therefore, the adhesive sheet may include an adhesive film, or may be replaced by an adhesive film.

An adhesive layer that constitutes a sheet may be formed such that dots serving as the adhesive layer are arranged side by side in rows and columns, as shown in FIG. 1, or may be formed such that the dots alternate whenever each row or column is changed, as shown in FIG. 2.

Referring to FIGS. 1 to 4, an adhesive sheet according to an embodiment of the present invention includes a base layer 110, an adhesive layer, and a release paper 150, which are sequentially disposed. After the release paper 150 is removed, the adhesive layer may be attached to a target for attachment.

The base layer 110 is a part that constitutes a base film of the adhesive sheet, and at least one of a colored or transparent film, which is made of at least one of Polyvinylchloride (PVC), polypropylene (PP), polyethylene (PE), polyethylene terephthalate (PET), polyimide (PI), polyamide (PA), polycarbonate (PC), PS, or OPP, a natural paper, or a synthetic paper, may be used as the base layer 110.

The base layer 110 may have a thickness ranging from 0.1 μm to 5 mm. In the case in which the thickness of the base layer 111 is less than 0.1 μm, it may be difficult to secure sufficient strength and rigidity of the base layer 110. In the case in which the thickness of the base layer 111 is greater than 5 mm, on the other hand, the strength and rigidity of the base layer 110 may be excessively increased, whereby the elongation of the base layer 110 may be reduced.

The adhesive layer is attached to one surface of the base layer 110. In this case, the adhesive layer may have one surface, which is attached to a corresponding one surface of the base layer 110 so as to contact the corresponding one surface of the base layer 110, and the other surface, which is opposite the one surface. The adhesive layer may be constituted by an adhesive agent or an adhesive film that is made of at least one of organic matter, acrylic, silicon, polyester, polyurethane, ethylene co-vinyl acetate (EVA), polyvinyl acetate (PVAc), or rubber.

In the following, the term "adhesive" will be used. However, the term "adhesive" may be intended to include bonding. Of course, therefore, the adhesive layer may include a bonding layer, or may be replaced by a bonding layer.

The adhesive layer may have a thickness ranging from 0.5 μm to 1 mm. In the case in which the thickness of the adhesive layer is less than 0.5 μm, it may be difficult to secure an appropriate level of adhesive force of the adhesive layer. In the case in which the thickness of the adhesive layer is greater than 1 mm, on the other hand, the amount of an adhesive agent that is used may be increased, whereby the hardness of a product may be reduced and the heat resistance of the product may be deteriorated.

The adhesive layer includes a first adhesive layer 120, which is attached to one surface of the base layer 110, and second adhesive layers 130 attached to the first adhesive layer 120 and to the release paper 150, the second adhesive layers 130 being arranged so as to form a pattern. The first adhesive layer 120 and the second adhesive layers 130 may remain attached to the target for attachment. The first adhesive layer 120 and the second adhesive layers 130 may be made of the same material or different kinds of materials.

As shown in FIG. 3, second adhesive layers 130 according to an embodiment of the present invention may be recessed into the first adhesive layer 120 from one surface of the first adhesive layer 120 in order to form a pattern.

The pattern may be an adhesive or printed pattern. The printed pattern may be formed on the release paper 150, and at the same time discharge paths 10 for discharging air or moisture may be formed on the release paper 150. Specifically, in the case in which the adhesive layer is attached to the target for attachment after the release paper 150 is removed, the discharge paths 10 may be formed between the second adhesive layers 130 and the target for attachment in order to discharge air or moisture.

As shown in FIG. 4, second adhesive layers 130 according to another embodiment of the present invention may protrude outwards from one surface of the first adhesive layer 120 in order to form a pattern.

The pattern may be an adhesive or printed pattern. The printed pattern may be formed on the release paper 150, and at the same time discharge paths 10 for discharging air or moisture may be formed on the release paper 150. Specifically, in the case in which the adhesive layer is attached to the target for attachment after the release paper 150 is removed, the discharge paths 10 may be formed between the second adhesive layers 130 in order to discharge air or moisture.

When the adhesive layer is attached to the target for attachment after the release paper 150 is removed, the base layer 110 may be pressed in order to discharge air or moisture. In this case, the first adhesive layer 120 may adhere to the target for attachment through the space defined between the second adhesive layers 130 as the base layer 110 is pressed.

In the drawings, the thickness of each of the second adhesive layers 130 is exaggeratedly shown in order to easily describe the structure of the adhesive layer. However, it may be understood that the actual thickness of each of the second adhesive layers 130 is less than the thickness of the base layer 110 or the first adhesive layer 120.

Each of the first adhesive layer 120 and the second adhesive layers 130 may be made of a material including at least one of organic matter, acrylic, silicon, metal silicon, polyester, polyurethane, ethylene co-vinyl acetate (EVA), or polyvinyl acetate (PVAc).

More specifically, each of the first adhesive layer 120 and the second adhesive layers 130 may be made of at least one of an adhesive agent, a bonding agent, paint, ink, or diffusion beads including the above-specified material(s).

Particularly, in the case in which each of the second adhesive layers 130 is made of at least one of paint, ink, or diffusion beads, it is possible to easily discharge air or moisture by applying pressure to the second adhesive layers 130 when the adhesive sheet is attached to the target for attachment, since the initial adhesive force of the second adhesive layers 130 is low. Since the adhesive force of the second adhesive layers 130 is increased over time, however, the second adhesive layers 130 become relatively strongly adhered to the target for attachment, whereby it is possible to secure the reliability of the adhesive sheet.

That is, in the case in which each of the second adhesive layers 130 is made of the above-specified material(s), the second adhesive layers 130 may be aged such that the adhesive force of the second adhesive layers 130 gradually becomes higher than the adhesive force of the second adhesive layers 130 when the second adhesive layers 130 are initially attached to the target for attachment.

In addition, according to the present invention, the second adhesive layers 130 are attached to one surface of the first adhesive layer 120, and at the same time the discharge paths 10 for discharging air or moisture are formed. When the adhesive sheet is attached to the target for attachment, therefore, it is not necessary to use water, whereby it is possible to solve a problem of freezing due to the use of water in the winter season, in which the temperature is low.

The second adhesive layers 130 may form a dot pattern in which a plurality of circles is arranged in a matrix form when viewed in a plan view.

Meanwhile, in the case in which the width of each of the discharge paths 10, which are formed by the second adhesive layers 130, is less than 0.1 μm, it may be difficult for the discharge paths 10 to discharge air or moisture, since the space defined by the discharge paths 10 is very small. In the case in which the width of each of the discharge paths is greater than 50 mm, on the other hand, the adhesive force of the second adhesive layers 130 to one surface of the first adhesive layer 120 may be reduced, since the area of the discharge paths is excessively large.

The release paper 150 may be attached to one surface of the adhesive layer so as to seal the discharge paths 10, whereby it is possible for the release paper 150 to protect the first adhesive layer 120, the second adhesive layers 130, the pattern formed by the second adhesive layers 130, and the discharge paths 10.

The release paper 150 may be made of at least one of an epoxy-based material, an epoxy-melamine-based material, an amino-alkyd-based material, an acrylic-based material, a melamine-based material, a silicon-based material, a fluorine-based material, a cellulose-based material, a urea-resin-based material, a polyolefin-based material, or a paraffin-based material.

Furthermore, the release paper 150 may be formed so as to have an embossed shape including a plurality of concave shapes, a plurality of convex shapes, or a combination of concave and convex shapes, or an embossed shape including at least one of a plurality of dots, a plurality of lines, a plurality of dotted lines, a plurality of circles, or a plurality of polygons, or a combination of composite patterns, in addition to a planar shape.

In addition, the release paper 150 may have a thickness ranging from 1 μm to 2 mm. In the case in which the thickness of the release paper 150 deviates from the above range, i.e. if the release paper 150 is too thin or thick, it may be difficult to handle the release paper 150.

Figure 5:
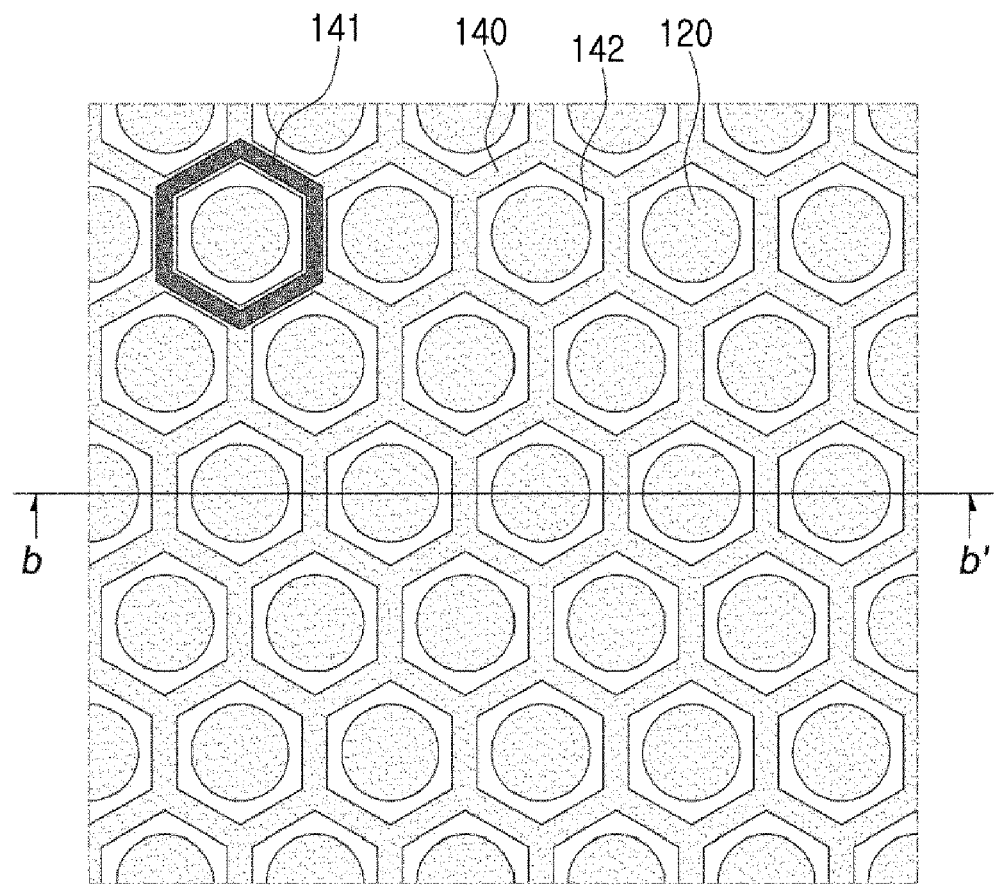
FIG. 5 is a plan view of an adhesive sheet having a barrier according to an embodiment of the present invention applied thereto.
Figure 6:
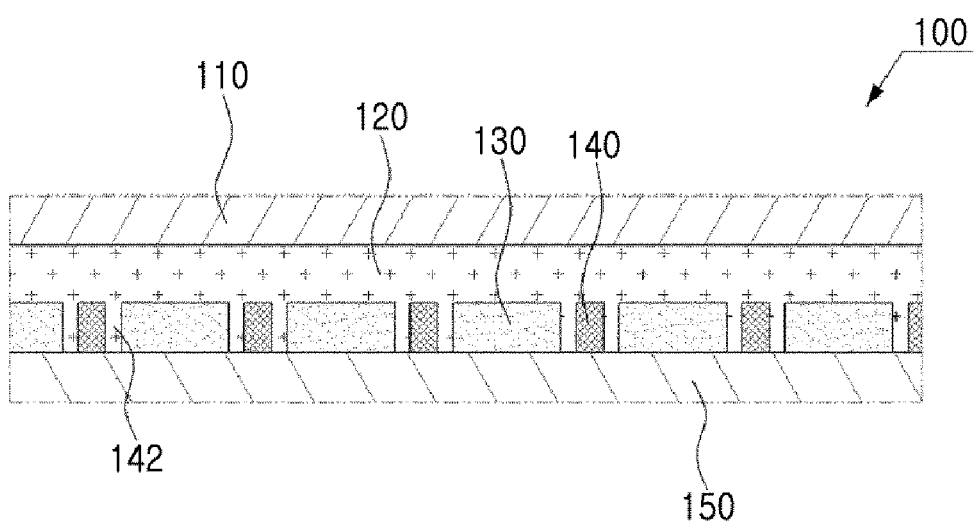
FIG. 6 is a sectional view of a first adhesive sheet having a barrier according to the present invention applied thereto.
Figure 7:
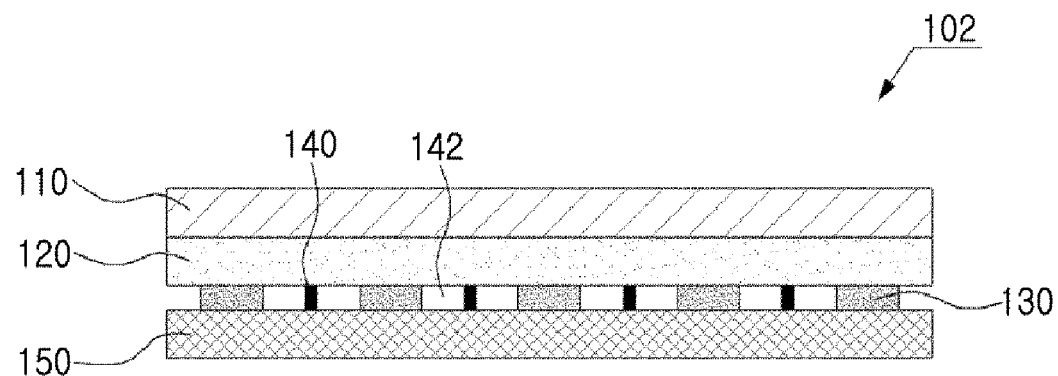
FIG. 7 is a sectional view of a second adhesive sheet having a barrier according to the present invention applied thereto.

FIG. 5 is a plan view of an adhesive sheet having a barrier according to an embodiment of the present invention applied thereto, FIG. 6 is a sectional view of a first adhesive sheet having a barrier according to the present invention applied thereto, and FIG. 7 is a sectional view of a second adhesive sheet having a barrier according to the present invention applied thereto.

The basic structure of a first adhesive sheet 100 excluding a barrier 140 is identical to the structure of the adhesive sheet of FIG. 3, and the basic structure of a second adhesive sheet 102 excluding a barrier 140 is identical to the structure of the adhesive sheet of FIG. 4.

Referring to FIGS. 5 to 7, an adhesive sheet having a barrier 140 according to an embodiment of the present invention applied thereto is characterized in that the adhesive sheet further includes a barrier 140 disposed so as to surround the second adhesive layers 130 to form a plurality of collection portions 142, in addition to the structure described above.

In the case of a conventional adhesive sheet having no barrier 140, even after air is discharged through the discharge paths at the time of attachment of the adhesive sheet, some of the discharge paths remain. As a result, external air or moisture is reintroduced into the remaining discharge paths, whereby the attachment performance of the adhesive sheet is deteriorated, and the period during which the adhesive sheet remains attached to the target for attachment is shortened.

In contrast, in the adhesive sheet having the barrier 140 according to the present invention applied thereto, the barrier is formed in the space defined by the discharge paths 10 so as to surround the second adhesive layers 130. Even after the adhesive sheet is attached to the target for attachment, therefore, it is possible to prevent the introduction of air or moisture from the outside, whereby it is possible to prevent deterioration in the attachment performance of the adhesive sheet or to prevent a reduction in the period during which the adhesive sheet remains attached to the target for attachment.

Figure 13:
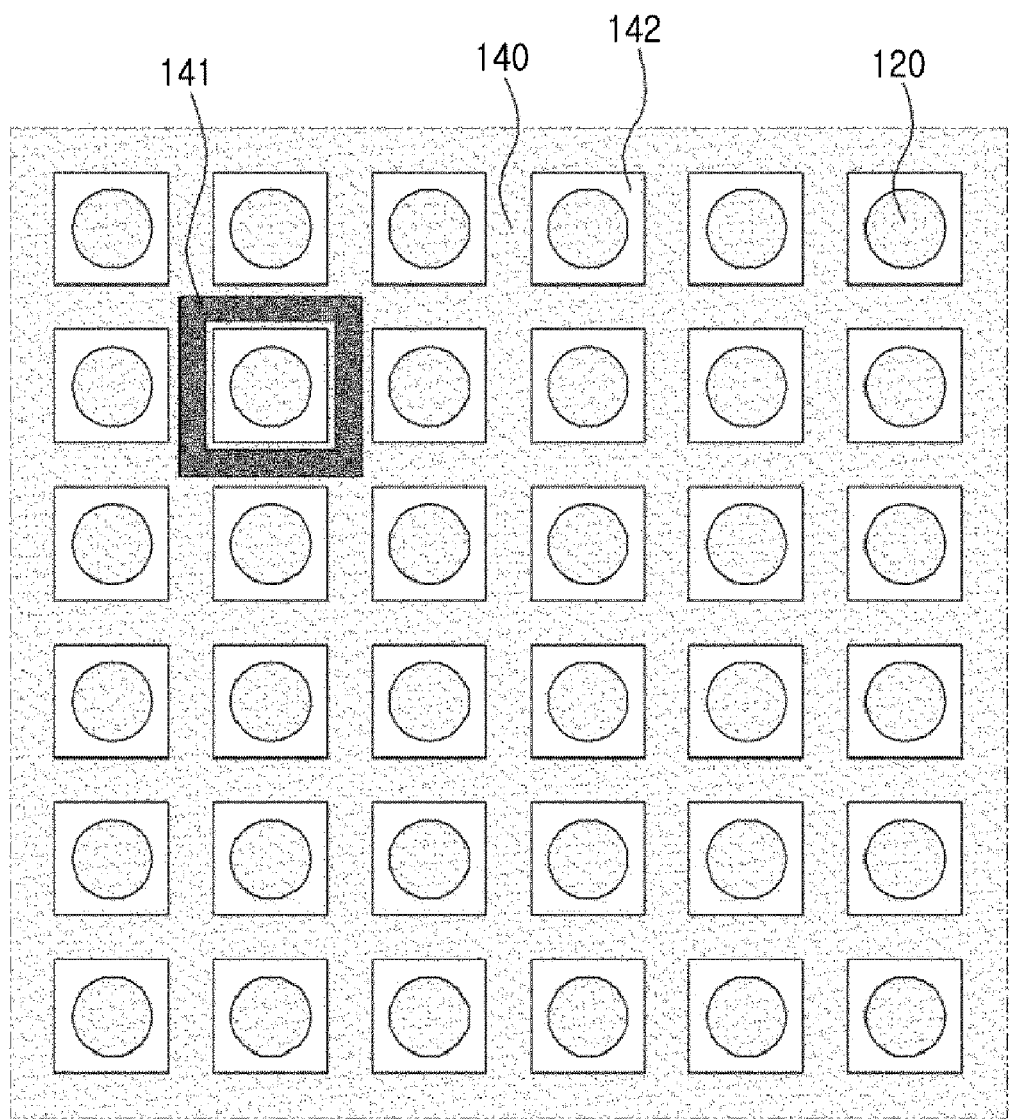
FIG. 13 is a plan view of an adhesive sheet having a barrier according to another embodiment of the present invention applied thereto.

The barrier 140 may be constituted by a plurality of polygonal unit patterns 141 in order to improve the durability of the barrier 140 and to improve the convenience of manufacture. Each of the polygonal unit patterns 141 may be quadrangular as shown in FIG. 5, or hexagonal as shown in FIG. 13. However, the shape of each of the polygonal unit patterns 141 is not limited to the polygonal shape described above. The polygonal unit patterns 141 may have any structure, as long as the barrier 140 is spaced apart from the second adhesive layers 130 by a predetermined distance in order to form a pattern while forming the collection portions 142.

In addition, the collection portions 142, which are formed by the barrier 140, may provide space for collecting air or moisture.

Generally, even in the case in which a skilled worker attaches the adhesive sheet to the target for attachment after the release paper 150 is removed, a small amount of air bubbles may be generated between the adhesive sheet and the target for attachment. The collection portions 142 according to the present invention serve to hold, absorb, and collect the air bubbles. Consequently, it is possible to fundamentally prevent the adhesive sheet from being nonuniformly attached to the target for attachment due to the air bubbles.

That is, most of the air bubbles are discharged through the discharge paths, and some of the air bubbles, which have not been discharged, are collected by the collection portions 142 according to the present invention. Consequently, it is possible to prevent an air bubble layer from being formed between the adhesive sheet and the target for attachment.

Figure 8:
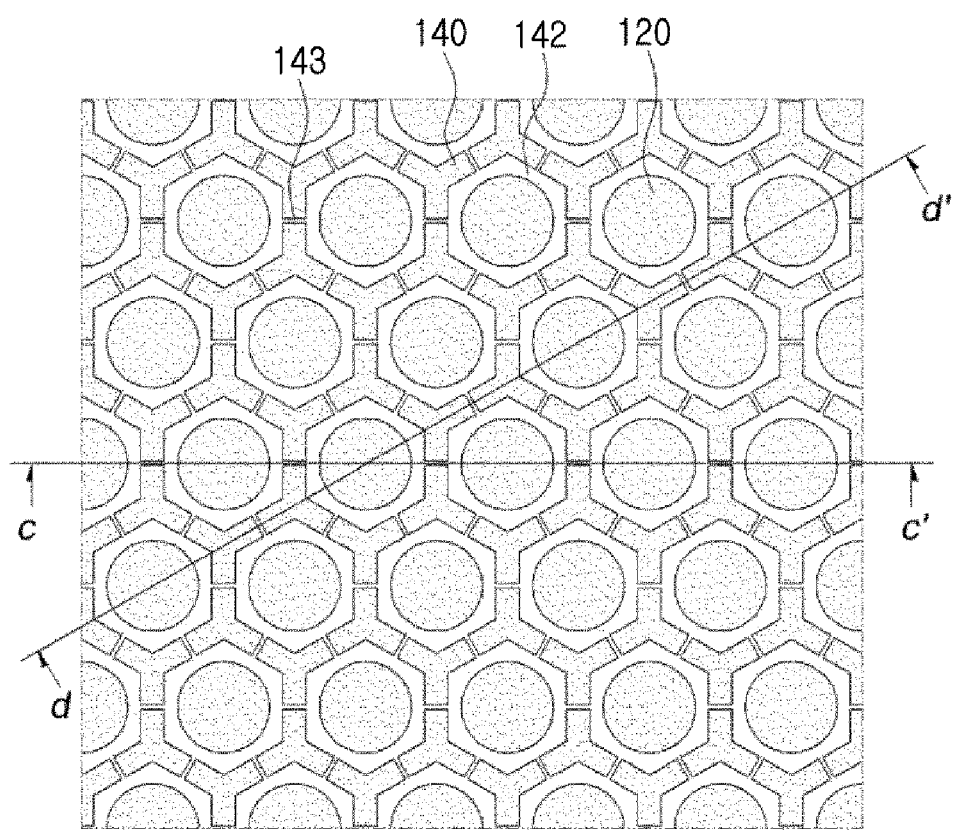
FIG. 8 is a plan view of an adhesive sheet having a barrier provided therein with a plurality of micro-scale channels according to the present invention applied thereto.
Figure 9:
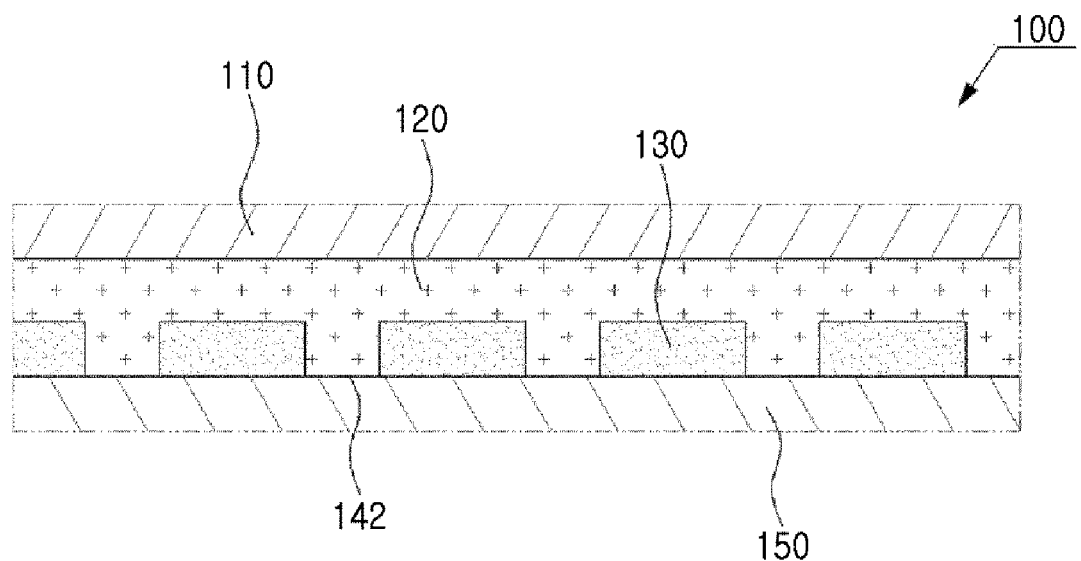
FIG. 9 is a sectional view of the first adhesive sheet according to the present invention taken along line c-c' of FIG. 8.
Figure 10:
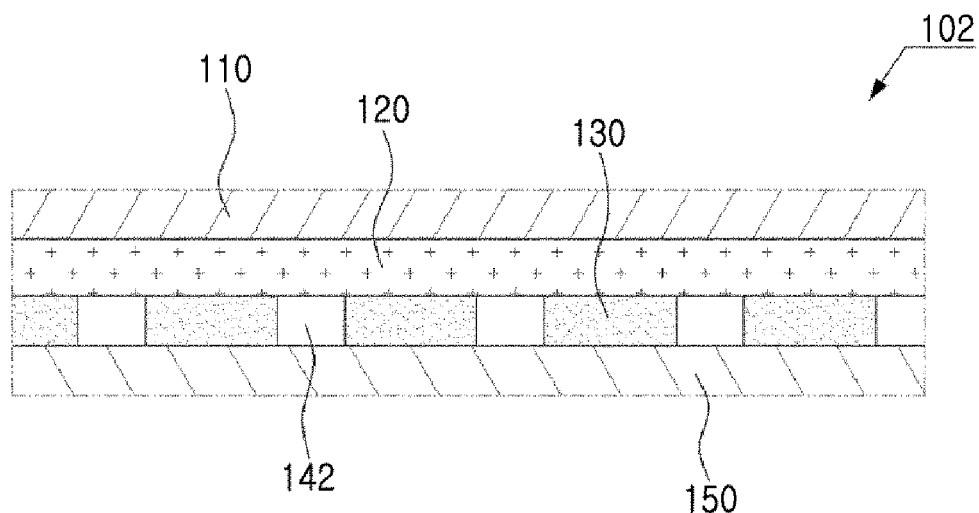
FIG. 10 is a sectional view of the second adhesive sheet according to the present invention taken along line c-c' of FIG. 8.
Figure 11:
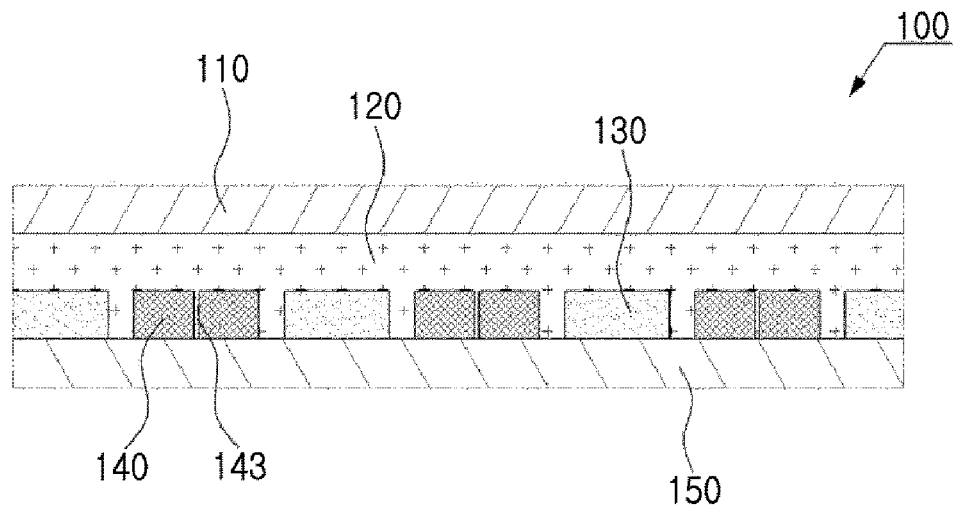
FIG. 11 is a sectional view of the first adhesive sheet according to the present invention taken along line d-d' of FIG. 8.
Figure 12:
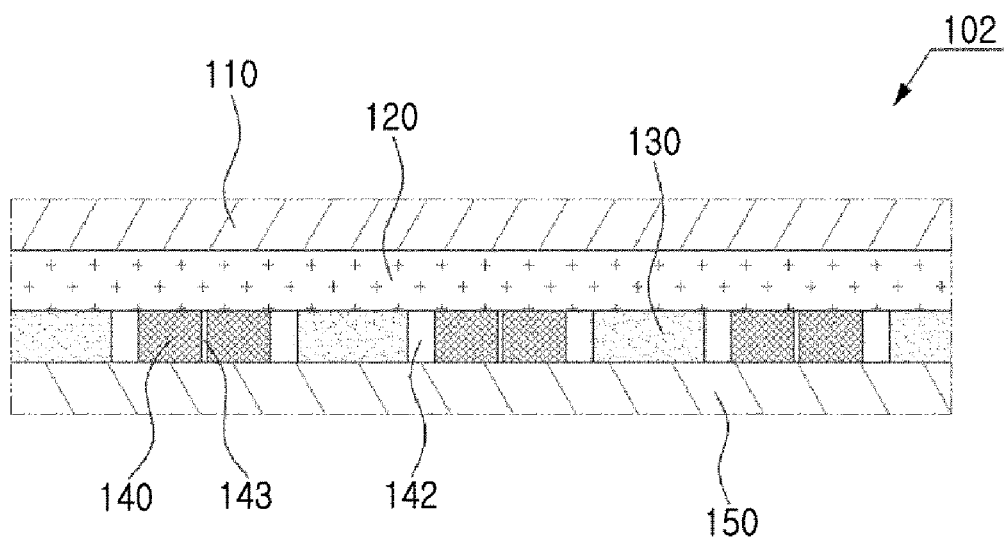
FIG. 12 is a sectional view of the second adhesive sheet according to the present invention taken along line d-d' of FIG. 8.

FIG. 8 is a plan view of an adhesive sheet having a barrier provided therein with a plurality of micro-scale channels according to the present invention applied thereto, FIG. 9 is a sectional view of the first adhesive sheet according to the present invention taken along line c-c' of FIG. 8, FIG. 10 is a sectional view of the second adhesive sheet according to the present invention taken along line c-c' of FIG. 8, FIG. 11 is a sectional view of the first adhesive sheet according to the present invention taken along line d-d' of FIG. 8, and FIG. 12 is a sectional view of the second adhesive sheet according to the present invention taken along line d-d' of FIG. 8.

Referring to FIGS. 8 to 12, each of the unit patterns 141, which constitute the barrier 140 according to the present invention, is provided with a plurality of micro-scale channels 143 for interconnecting adjacent collection portions 142.

As described above, the collection portions 142 according to the present invention may serve to hold, absorb, and collect air bubbles that may be generated between the adhesive sheet and the target for attachment when the adhesive sheet is attached to the target for attachment. In general, the positions at which air bubbles are generated are nonuniform, even though the volumes in the collection portions 142 are uniform.

Each of the unit patterns 141 may be provided with a plurality of micro-scale channels 143 for interconnecting adjacent collection portions 142. Even when air bubbles are nonuniformly generated, therefore, air constituting the air bubbles may be uniformly distributed to the respective collection portions 142 through the micro-scale channels 143. Consequently, it is possible to greatly improve efficiency in holding, absorbing, and collecting air bubbles that may be generated between the adhesive sheet and the target for attachment.

In addition, the adhesive sheet may be pressed after the adhesive sheet is attached to the target for attachment. As a result, the width of each of the micro-scale channels 143 may be reduced. After the lapse of a predetermined amount of time, the micro-scale channels 143 may disappear.

That is, the micro-scale channels 143 serve as air paths, through which air bubbles are uniformly distributed to the respective collection portions 142 when the adhesive sheet is attached to the target for attachment. After the adhesive sheet is attached to the target for attachment, however, the width of each of the micro-scale channels 143 may be reduced due to aging or pressing, whereby it is possible to prevent the introduction of external air or moisture through the micro-scale channels 143.

Each of the micro-scale channels 143 may have a width ranging from 10 μm to 50 μm, preferably from 10 μm to 30 μm. In the case in which the width of each of the micro-scale channels 143 is less than 10 μm, it is not possible for the micro-scale channels 143 to sufficiently serve as paths through which air constituting air bubbles may move. In the case in which the width of each of the micro-scale channels 143 is greater than 30 μm, on the other hand, it is difficult for each of the micro-scale channels 143 to disappear even after the lapse of a predetermined amount of time since the adhesive sheet was attached to the target for attachment. For these reasons, it is preferable for the width of each of the micro-scale channels 143 to be within the above-specified range.

Figure 14:
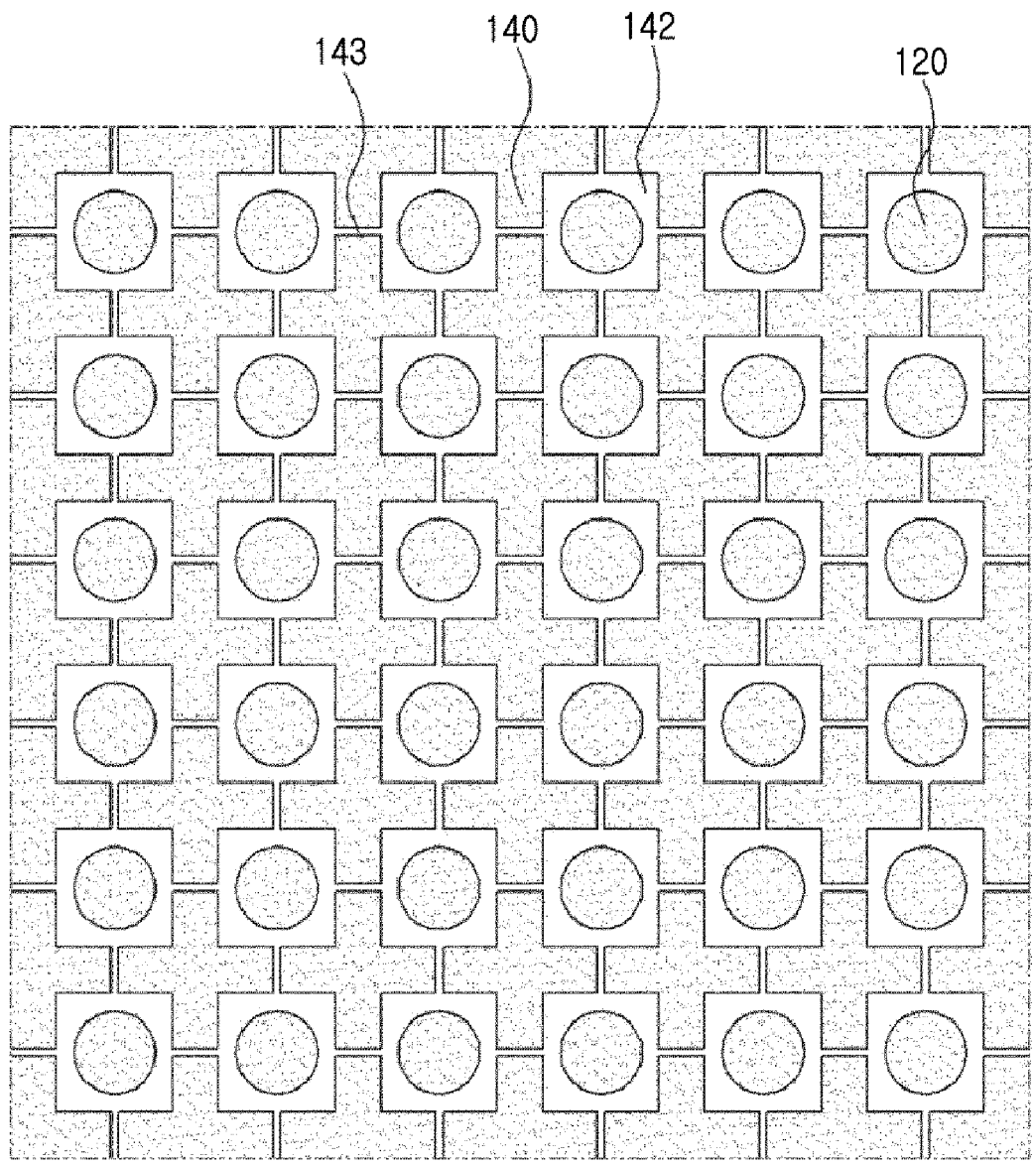
FIG. 14 is a plan view of an adhesive sheet having a barrier provided therein with a plurality of micro-scale channels according to another embodiment of the present invention applied thereto.

FIG. 13 is a plan view of an adhesive sheet having a barrier according to another embodiment of the present invention applied thereto, and FIG. 14 is a plan view of an adhesive sheet having a barrier provided therein with a plurality of micro-scale channels according to another embodiment of the present invention applied thereto.

As previously described, the barrier 140 may be constituted by a plurality of polygonal unit patterns 141. Each of the polygonal unit patterns 141 may be hexagonal, as shown in FIG. 5, or quadrangular, as shown in FIG. 13. However, the above-described shape is merely an example, and therefore the present invention is not limited thereto.

Figure 15:
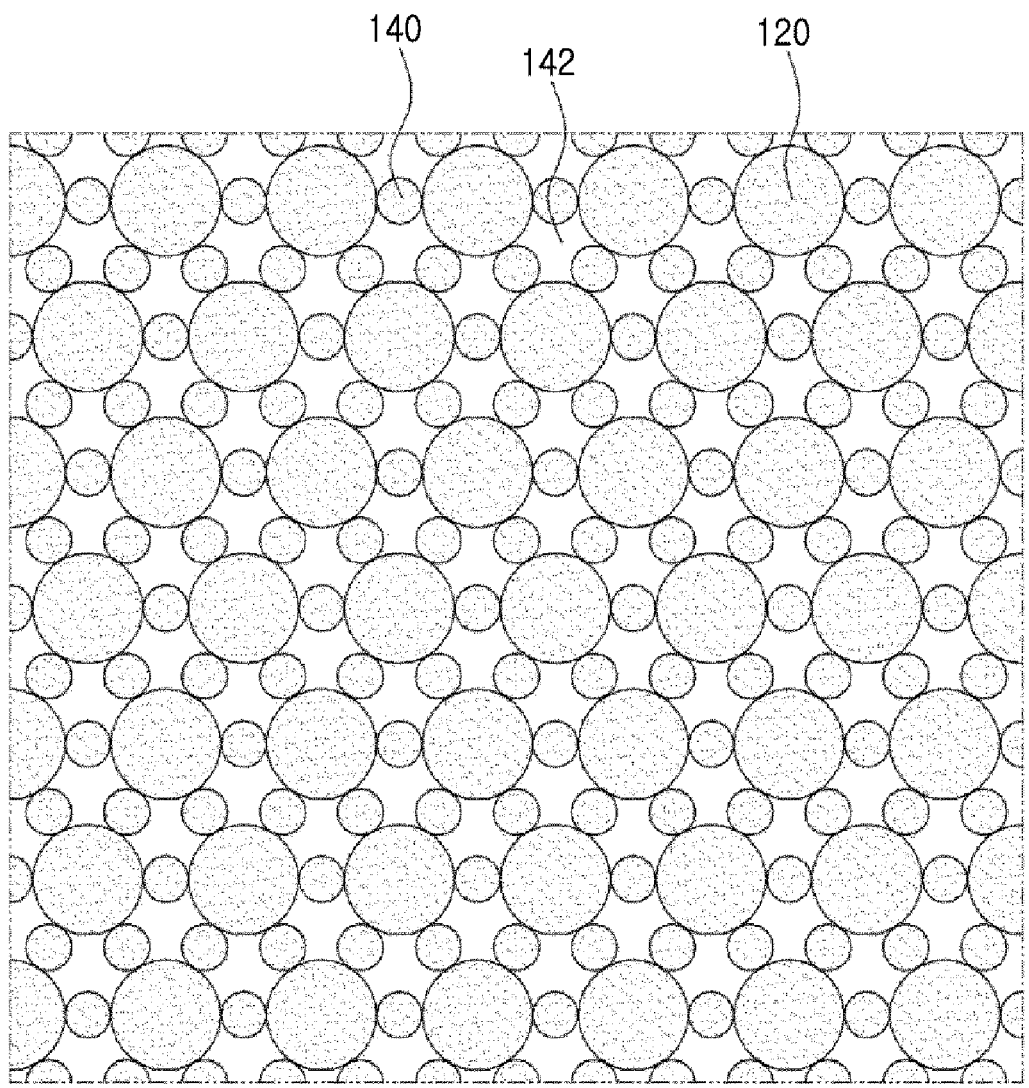
FIG. 15 is a plan view of an adhesive sheet having a barrier according to a further embodiment of the present invention applied thereto.
Figure 16:
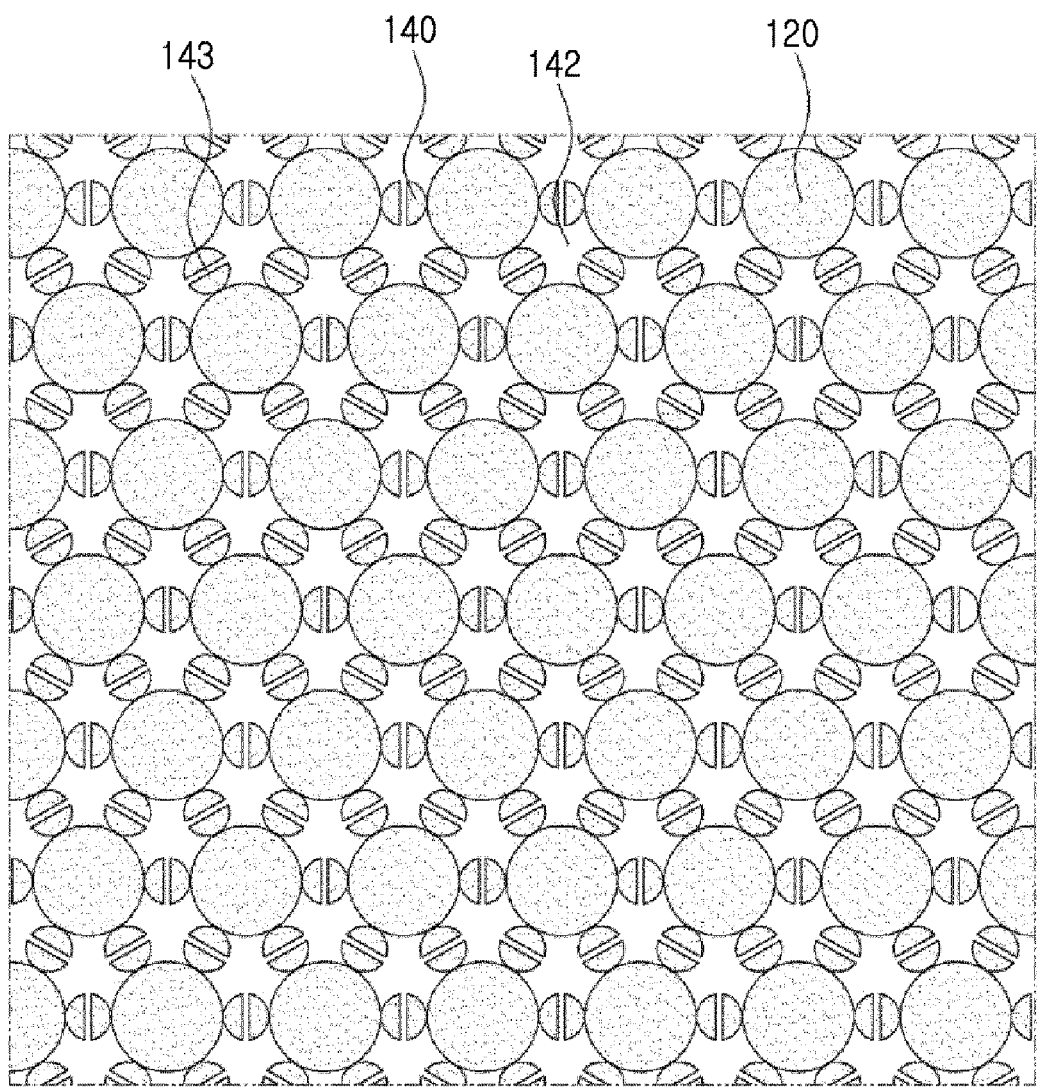
FIG. 16 is a plan view of an adhesive sheet having a barrier provided therein with a plurality of micro-scale channels according to a further embodiment of the present invention applied thereto.

FIG. 15 is a plan view of an adhesive sheet having a barrier according to a further embodiment of the present invention applied thereto, and FIG. 16 is a plan view of an adhesive sheet having a barrier provided therein with a plurality of micro-scale channels according to a further embodiment of the present invention applied thereto.

Referring to FIGS. 15 and 16, the adhesive sheet is characterized in that a barrier 140 is formed between a plurality of second adhesive layers 130 so as to have a dot pattern. The barrier 140 may be provided with a plurality of micro-scale channels, through each of which adjacent collection portions 142 are connected to each other.

Each dot constituting the dot pattern is circular. However, the present invention is not limited thereto. Each dot of the dot pattern may be formed in any of various other shapes that can form the collection portions 142, such as an oval shape or a quadrangular shape.

Figure 17:
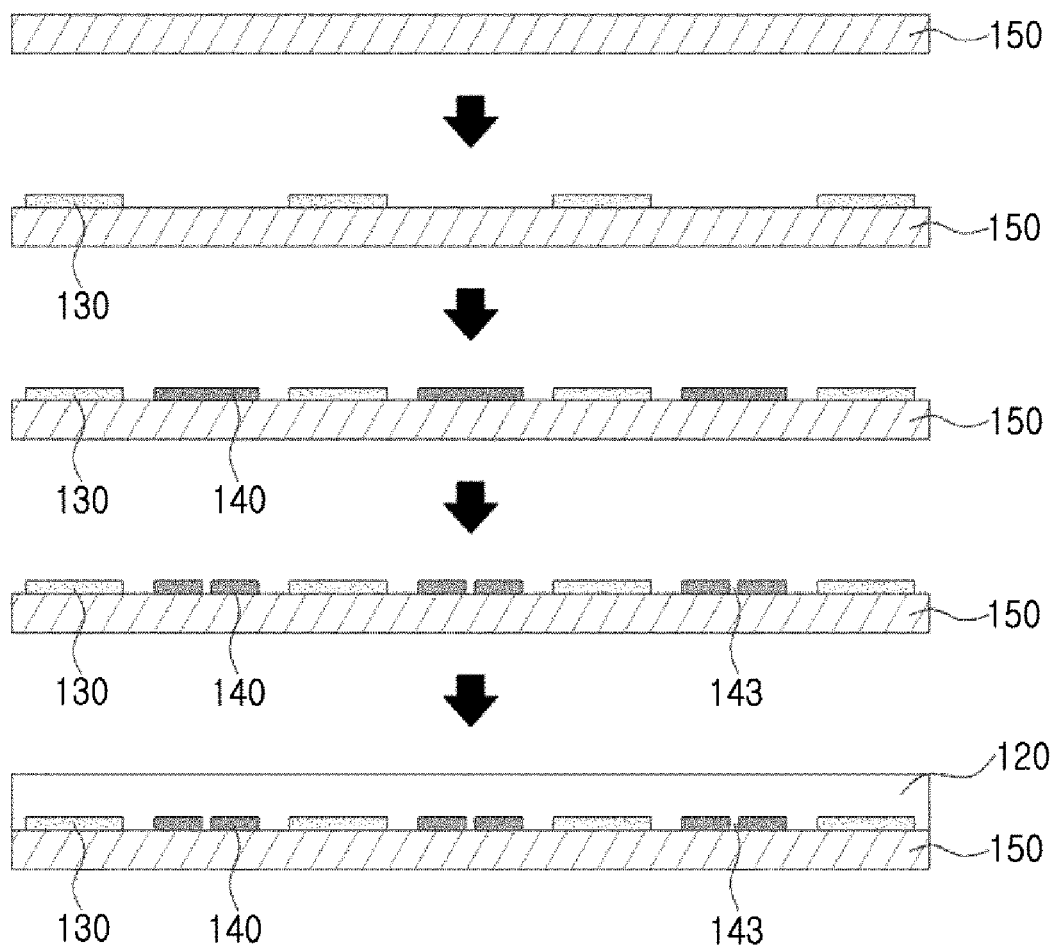
FIG. 17 is a sectional view showing a process of manufacturing an adhesive sheet having a barrier according to an embodiment of the present invention applied thereto.

FIG. 17 is a sectional view showing a process of manufacturing an adhesive sheet having a barrier according to an embodiment of the present invention applied thereto.

Referring to FIG. 17, first, a release paper 150 is introduced between first rollers in order to manufacture an adhesive sheet having a barrier 140 according to an embodiment of the present invention.

The introduced release paper 150 passes between second rollers. At this time, second adhesive layers 130 may be attached to one surface of the release paper 150 by an adhesive layer formation device in order to form a pattern. The attachment may be achieved by printing.

Here, any one of gravure printing, offset printing, silkscreen printing, digital printing, and transfer printing may be performed as the printing. Here, the transfer printing may be pressure-transfer-printing or heat-transfer-printing. In the heat-transfer-printing, foil having a specific pattern or specific letters engraved thereon is attached to the release paper 150, and then the specific pattern or the specific letters are transferred to the release paper 150 using heat or light supplied from a heat source, an ultraviolet (UV) light source, or an infrared (IR) light source.

Subsequently, the release paper 150, on which the second adhesive layers 130 have been printed, passes between third rollers. At this time, a barrier 140 having a plurality of collection portions formed so as to surround the second adhesive layers 130 may be printed on the release paper 150.

The release paper 150, on which the barrier 140 has been further printed, passes between fourth rollers. At this time, the release paper 150 may be removed, and a base adhesive sheet including a base layer 110 and a first adhesive layer 120 may be introduced using fifth rollers.

Before the introduction of the base adhesive sheet, a plurality of micro-scale channels 143 may be formed in the barrier 140 using a copper plate having a pattern formed thereon.

Subsequently, the base adhesive sheet and the release paper 150 may be laminated such that the first adhesive layer 120, the second adhesive layers 130, and the barrier 140 are bonded to each other, whereby an adhesive sheet may be manufactured. The manufactured adhesive sheet may be discharged using sixth rollers.

The base adhesive sheet and the release paper 150 may be laminated such that the second adhesive layers 130 protrude outwards from the first adhesive layer 120 in order to form a pattern, whereby it is possible to manufacture the second adhesive sheet 102 shown in FIG. 12. Alternatively, the base adhesive sheet and the release paper 150 may be laminated such that the second adhesive layers 130 are recessed into the first adhesive layer 120 from one surface of the first adhesive layer 120 in order to form a pattern, whereby it is possible to manufacture the first adhesive sheet 100 shown in FIG. 11.

As described above, the preferred embodiments of the present invention have been disclosed in the drawings and the specification. Although specific terms have been used, the terms have been provided merely to describe the present invention but not to limit the meaning or to limit the scope of the present invention disclosed in the accompanying claims. Consequently, those skilled in the art will appreciate that various modifications and other equivalent embodiments therefrom are possible. Therefore, the true technical protection scope of the present invention should be limited by the technical idea of the accompanying claims.

The invention claimed is:

1. An adhesive sheet comprising a base layer, an adhesive layer, and a release paper, which are sequentially disposed, the adhesive layer being attached to a target for attachment after the release paper is removed, wherein
the adhesive layer comprises:
a first adhesive layer, which is attached to one surface of the base layer; and
second adhesive layers attached to the first adhesive layer and to the release paper, the second adhesive layers being arranged so as to form a pattern; and
a barrier disposed so as to surround the second adhesive layers to form a plurality of collection portions,
wherein the second adhesive layers are recessed into the first adhesive layer from one surface of the first adhesive layer in order to form the pattern, and
wherein the second adhesive layers are aged such that an adhesive force of the second adhesive layers gradually becomes higher than an adhesive force of the second adhesive layers when the second adhesive layers are initially attached to the target for attachment.

2. The adhesive sheet according to claim 1, wherein discharge paths are formed between the second adhesive layers and the target for attachment.

3. An adhesive sheet comprising a base layer, an adhesive layer, and a release paper, which are sequentially disposed, the adhesive layer being attached to a target for attachment after the release paper is removed, wherein
the adhesive layer comprises:
a first adhesive layer, which is attached to one surface of the base layer; and
second adhesive layers attached to the first adhesive layer and to the release paper, the second adhesive layers being arranged so as to form a pattern; and
a barrier disposed so as to surround the second adhesive layers to form a plurality of collection portions,
wherein the second adhesive layers protrude outwards from one surface of the first adhesive layer in order to form the pattern, and
wherein the second adhesive layers are aged such that an adhesive force of the second adhesive layers gradually becomes higher than an adhesive force of the second adhesive layers when the second adhesive layers are initially attached to the target for attachment.

4. The adhesive sheet according to claim 3, wherein discharge paths are formed between the second adhesive layers.

5. The adhesive sheet according to claim 1, wherein each of the first adhesive layer and the second adhesive layers is made of a material comprising at least one of organic matter, acrylic, silicon, metal silicon, polyester, polyurethane, ethylene co-vinyl acetate (EVA), or polyvinyl acetate (PVAc).

6. An adhesive sheet comprising a base layer, an adhesive layer, and a release paper, which are sequentially disposed, the adhesive layer being attached to a target for attachment after the release paper is removed, wherein
the adhesive layer comprises:
a first adhesive layer, which is attached to one surface of the base layer; and
second adhesive layers attached to the first adhesive layer and to the release paper, the second adhesive layers being arranged so as to form a pattern; and
a barrier disposed so as to surround the second adhesive layers to form a plurality of collection portions,
wherein the barrier is constituted by a plurality of polygonal unit patterns.

7. The adhesive sheet according to claim 6, wherein each of the polygonal unit patterns is quadrangular or hexagonal.

8. The adhesive sheet according to claim 6, wherein each of the unit patterns is provided with a plurality of micro-scale channels for interconnecting adjacent ones of the collection portions.

9. The adhesive sheet according to claim 8, wherein each of the micro-scale channels has a width ranging from 10 µm to 50 µm.

10. The adhesive sheet according to claim 9, wherein the width of each of the micro-scale channels is reduced as a result of the adhesive sheet being pressed after the adhesive sheet is attached to the target for attachment.

* * * * *